United States Patent [19]
Kanno

[11] Patent Number: 5,630,256
[45] Date of Patent: May 20, 1997

[54] BUFFER CLIP

[75] Inventor: Yoshikazu Kanno, Kanagawa-ken, Japan

[73] Assignee: Nifco, Inc., Yokohama, Japan

[21] Appl. No.: 613,570

[22] Filed: Mar. 11, 1996

[30] Foreign Application Priority Data

Mar. 9, 1995 [JP] Japan .................................. 7-050134

[51] Int. Cl.$^6$ ...................................................... A44B 1/16
[52] U.S. Cl. .................... 24/297; 24/662; 24/324
[58] Field of Search ................. 24/297, 662, 324

[56] References Cited

FOREIGN PATENT DOCUMENTS 4-134712  12/1992  Japan .

*Primary Examiner*—Peter M. Cuomo
*Assistant Examiner*—Stephen Vu
*Attorney, Agent, or Firm*—Schwartz & Weinrieb

[57] ABSTRACT

A buffer clip for preventing the generation of an uncomfortable sound and wherein an impact force absorbing member does not separate from the clip due to vibration or the like. The buffer clip is inserted and fitted into a mounting hole formed in a concave portion vehicle roof trim near the free end of a sun visor and a clearance for allowing insertion of a user's hand is formed between the sun visor and an outer covering material of the roof trim of the vehicle interior. The force due to impact when the sun visor is raised is absorbed by a soft layer of the buffer clip. For this reason, the roof trim does not resonate and no uncomfortable sound is produced. Further, the soft layer is formed so as to cover a flange of the clip and a catch member of the soft layer engages a catch portion of the flange. Accordingly, there is no possibility that the soft layer can separate from the clip due to vibration or the like. Hollow portions formed in the soft layer allow the soft layer to easily bend and functions as a kind of air damper.

22 Claims, 4 Drawing Sheets

BUFFER CLIP

BACKGROUND OF THE INVENTION

1. Field of the Invention

The present invention relates to a buffer clip for forming a clearance for allowing insertion of a user's hand between a body for mounting a rotatable plate member thereon, and the rotatable plate member rotatably mounted upon the body.

2. Description of the Prior Art

As illustrated in FIG. 4, a sun visor 40 for protecting a driver's eyes from direct sunshine is rotatably mounted with respect to an upper portion of a vehicle front window. When the sun visor 40 is not used, it is disposed within a concave portion 42 formed in a roof trim 16 so as not to become an obstacle to the driver.

A clip 50 is mounted in the concave portion 42 near the free end of the sun visor 40 and a clearance is formed between the trim 16 and the sun visor 40, which allows insertion of a user's hand when the sun visor 40 disposed within the concave portion 42 is to be lowered. A plate-shaped head portion 52 of the clip 50 is coated with an outer covering material 18 for covering the roof trim 16 so as not to spoil the appearance of the vehicle interior.

Meanwhile, this conventional clip 50 is formed of a relatively hard resin material. For this reason, when the sun visor 40 is raised and it strikes against the head portion 52 of the clip 50, the vibration generated due to the sun visor 40 striking the head portion 52 is transmitted to the roof trim 16 and the roof trim 16 resonates. As a result, an uncomfortable sound is produced in the vehicle interior.

In order to eliminate the above-described inconvenience, a buffer pad has been proposed (see Japanese Utility Model Application Laid-Open No. 4-134712). The buffer pad disclosed therein is formed by a metallic claw portion which is mounted within a mounting hole of the roof trim by means of a bending operation, and an elastic body fixed to the claw portion with an adhesive agent. The elastic body can absorb shock forces due to the buffer pad being struck by the sun visor so the uncomfortable sound is not generated.

However, there exists a drawback in that, when the elastic body is simply fixed to the claw portion with the adhesive agent, the adhesive agent gradually deteriorates due to the vehicle operating vibration and the elastic body is accordingly separated from the claw portion.

OBJECT OF THE INVENTION

In view of the above-described circumstances, it is an object of the present invention to provide a buffer clip which does not produce uncomfortable sounds and prevents an impact force absorbing member from becoming separated from its support surface due to vibration or the like.

SUMMARY OF THE INVENTION

The present invention is a buffer clip which is mounted to a body for mounting a plate member thereon so as to form a clearance for allowing insertion of a user's hand between the body and the plate member which is rotatably and axially supported by the body for mounting thereon, and which comprises a leg portion inserted in and fitted into a mounting hole formed in the body for mounting the plate member thereon, a flange formed at one end of the leg portion, and a soft layer which covers the flange and elastically abuts against the plate member.

According to the buffer clip of the present invention, the leg portion is inserted and fitted into the mounting hole formed in the body for rotatably mounting the plate member thereon. The flange is formed in the leg portion and the soft layer is formed to cover the flange.

A clearance for allowing insertion of a user's hand is formed between the body for mounting the plate member and the plate member mounted thereon, with the soft layer abutting against the plate member. Even when the plate member strikes the buffer clip, the impact force is absorbed by the soft layer. For this reason, the body for mounting the plate member does not resonate and an uncomfortable sound is not produced. Further, since the soft layer is formed to cover the flange, it does not undergo separation from the flange due to vibration or the like.

In the case where a hollow portion is formed between the flange and the soft layer, the soft layer is easy to bend and vibration can be alleviated. Further, the hollow portion in which air is accumulated functions as a kind of air damper and vibration-reduction effects can be improved accordingly.

BRIEF DESCRIPTION OF THE DRAWINGS

Various other objects, features, and attendant advantages of the present invention will be more fully appreciated from the following detailed description when considered in connection with the accompanying drawings, in which like reference characters designate like or corresponding parts throughout the several views, and wherein.

DESCRIPTION OF THE PREFERRED EMBODIMENTS

Figure 1:
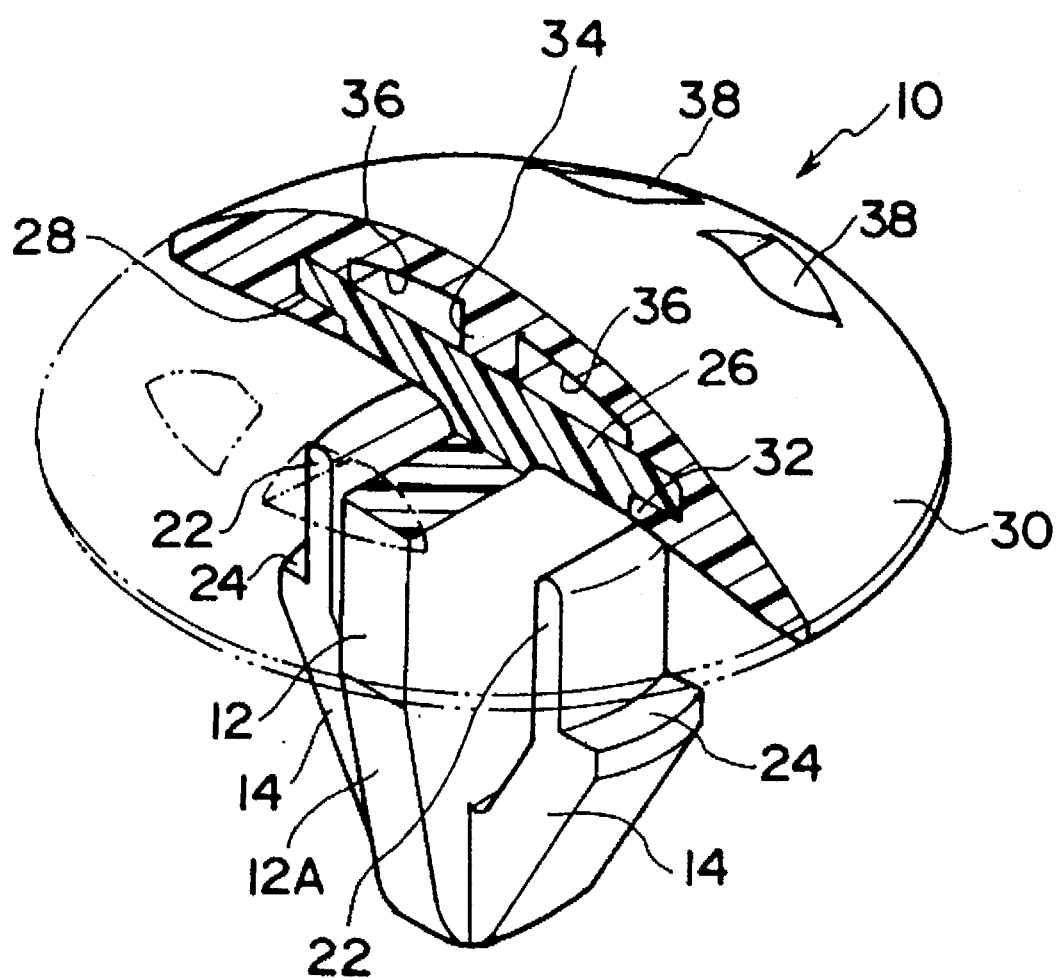
FIG. 1 is a perspective view of a buffer clip according to an embodiment of the present invention.
Figure 2:
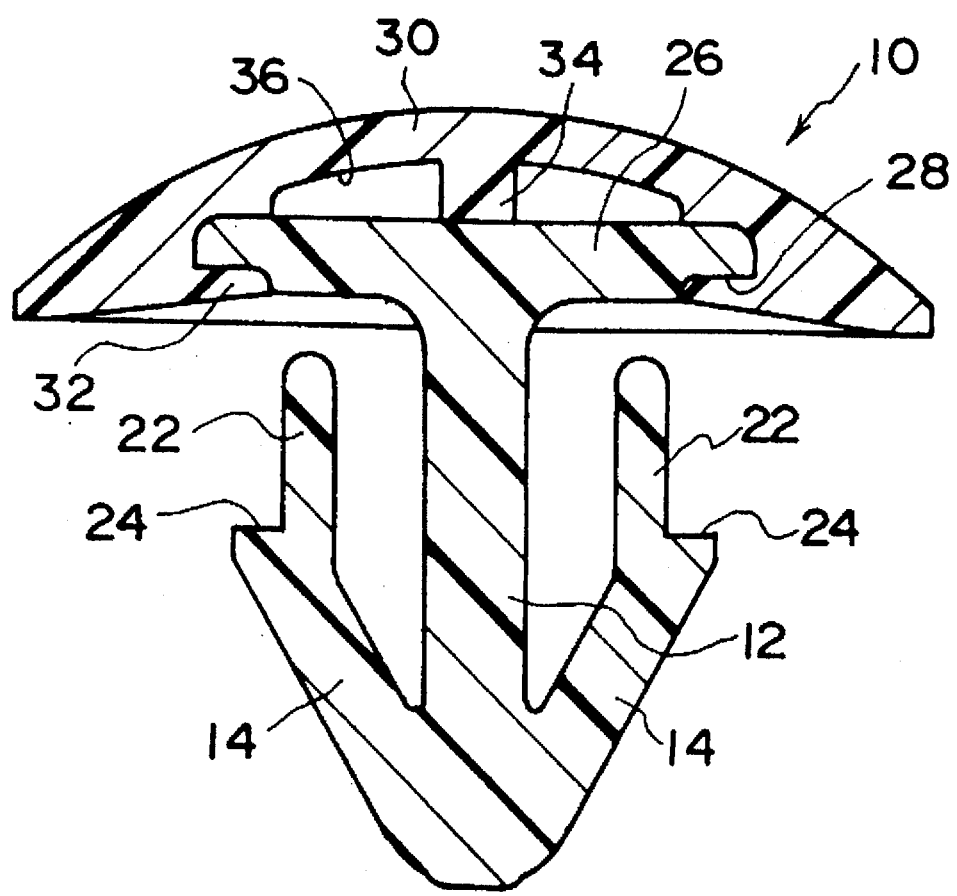
FIG. 2 is a cross-sectional view of the buffer clip according to the present embodiment.
Figure 3:
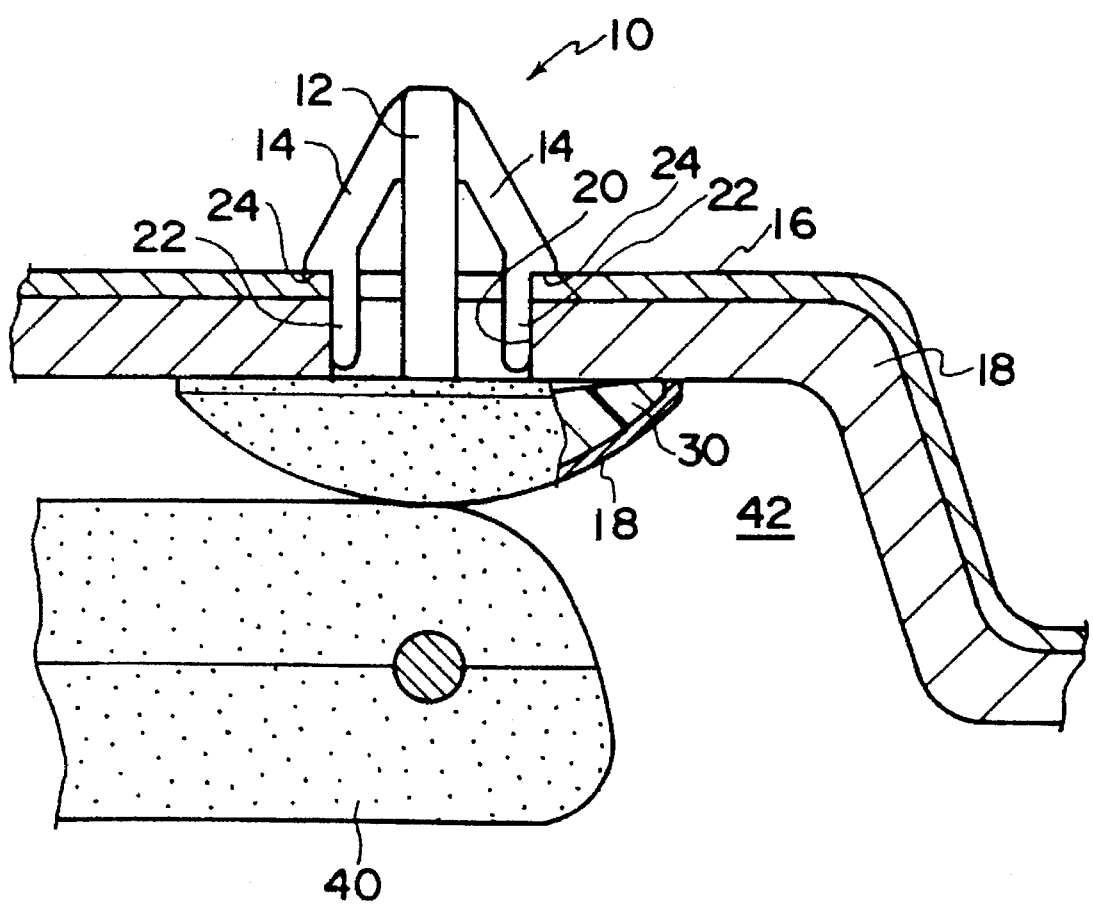
FIG. 3 is a cross-sectional view illustrating the state in which the buffer clip according to the present embodiment is mounted.
Figure 4:
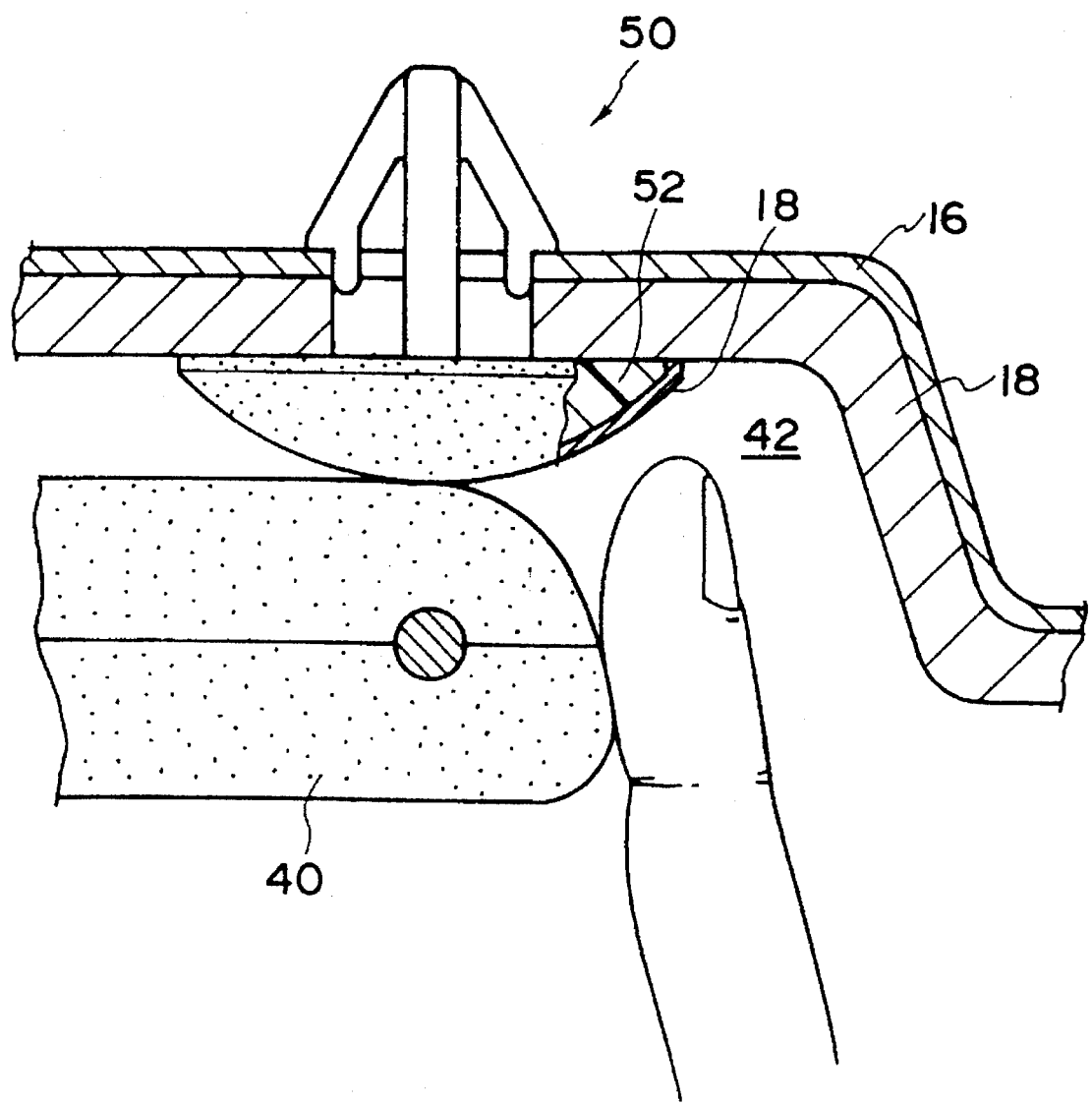
FIG. 4 is a cross-sectional view illustrating the state in which a conventional buffer clip is mounted.

Referring now to FIGS. 1 through 3, a description will be given of a buffer clip 10 according to an embodiment of the present invention. The buffer clip 10 includes a leg portion 12 formed in the shape of a rectangular plate. Claw portions 14 project from one end of the leg portion 12 in diverging directions with respect to each other. These claw portions 14 are respectively provided to bend toward the leg portion 12 when the leg portion 12 is inserted in a mounting hole 20 passing through a roof trim 16 and an outer covering material 18 adhered to the roof trim 16. Further, a tapered surface 12A is formed on each of both side surfaces of the leg portion 12 in such a manner as to gradually decrease the width of the leg portion toward the distal end of the leg portion, which makes it possible for the leg portion 12 to be easily inserted in the mounting hole 20.

An engaging portion 22 is formed upright at the end of each of the claw portions 14 so as to be disposed parallel with the leg portion 12. The thickness of the engaging portion 22 is made smaller than that of the claw portion 14 and a stepped portion 24 is formed at the end surface of the claw portion 14.

As a result, when the leg portion 12 is inserted in the mounting hole 20, the engaging portions 22 engage inner peripheral wall portions of the mounting hole 20 with pressure and the stepped portions 24 are retained at an edge of the mounting hole 20.

A disk-shaped flange 26 is formed at the opposite end of the leg portion 12. A annular concave catch portion 28 is formed within the outer peripheral portion of the lower surface of the flange 26. A soft layer element 30 is formed to cover the upper surface of the flange 26.

The upper surface of the soft layer 30 is formed as a spherical surface and the lower surface of the soft layer 30 is made hollow from its outer peripheral portion to its central portion, so that the soft layer 30 is formed to easily bend with its outer peripheral portion serving as a supporting point. Further, a catch member 32 is formed on the lower surface of the soft layer 30 so as to project toward the center of the soft layer 30. The catch member 32 is engaged with the catch portion 28 of the flange 26.

A beam portion 34 is formed across the center of the soft layer 30 and abuts against the upper surface of the flange 26. A hollow portion 36 is provided upon each one of both sides of the beam portion 34 to form a clearance between the flange 26 and the soft layer 30. The soft layer 30 is rendered easily bendable by the hollow portions 36. Further, the hollow portions 36 respectively communicate with through holes 38 formed on the upper surface of the soft layer 30. Accordingly, when the soft layer 30 elastically deforms, the through holes 38 serve as air dampers to discharge air accumulated in the hollow portions 36.

Meanwhile, in the buffer clip 10 according to the present embodiment, the leg portion 12, claw portions 14, engaging portions 22, and flange 26 are each made of NYLON and the soft layer 30 is made of an elastomer which excels in cushioning characteristics, namely, the buffer clip 10 has a two-piece integral construction. For this reason, it is not necessary to fix the soft layer 30 to other components with an adhesive agent or the like. However, even when the soft layer 30 is formed independently of the other components and is thereafter fixed to the other components, the engaging force of the catch member 32 and the catch portion 28 prevents the soft layer 30 from being separated from the leg member 12 due to vibration or the like.

Further, in order not to spoil the appearance of the vehicle interior, the soft layer 30 is coated with the outer covering material 18 for covering the roof trim 16.

Next, the operation of the present embodiment will be described.

The buffer clip 10 is inserted and fitted into the mounting hole 20 which is formed in a concave portion 42 provided adjacent to the free end of a sun visor 40 and a clearance for allowing insertion of a user's hand is formed between the outer covering material 18 of the trim 16 and the sun visor 40.

Thus, even when the sun visor 40 is raised and strikes against the buffer clip 10, the impact force is absorbed by the soft layer 30. For this reason, there is no possibility that the roof trim 16 will resonate and produce an uncomfortable sound. Further, the soft layer 30 is formed to cover the flange 26 and the catch member 32 and the catch portion 28 are engaged with each other. Accordingly, the soft layer 30 will not separate from the rest of the clip 10 due to vibration or the like.

Moreover, the hollow portions 36 provided between the flange 26 and the soft layer 30 allows the soft layer 30 to easily bend and function as a kind of air damper. As a result, the vibration can be substantially reduced.

Meanwhile, in the present embodiment, an example was described in which the buffer clip is mounted to the roof trim 16 of a vehicle. However, the present invention is not limited to the same, and may also be applied to any other structures in which an opening/closing cap is used. It is therefore to be understood that within the scope of the appended claims, the present invention may be practiced otherwise than as specifically described herein.

What is claimed is:

1. A buffer clip which is adapted to be mounted upon a body member so as to absorb impact forces and shocks which would otherwise be generated as a result of another member forcibly coming into contact with a body member, comprising:

leg means for insertion into a mounting hole formed within a body member and having means thereon for engaging a first surface of a body member;

a flange formed upon said leg means adapted to engage a second opposite surface of a body member such that said clip can be secured to a body member;

first engagement means defined upon said flange of said leg means;

a soft layer covering said flange of said leg means and being elastically deformable so as to absorb impact forces and shocks when another member, which would otherwise impact against a body member, impacts against said soft layer; and second engagement means defined upon said soft layer for engaging said first engagement means of said flange of said leg means such that said soft layer is mechanically secured upon said flange of said leg means.

2. A buffer clip according to claim 1, wherein said soft layer includes a hollow portion which is closed by said flange.

3. A buffer clip according to claim 2, wherein said soft layer includes a beam portion formed to cross the hollow portion and an end of the beam portion abuts against said flange.

4. A buffer clip according to claim 3, wherein the beam portion divides the hollow portion into a plurality of sections.

5. A buffer clip according to claim 3, wherein:

said soft layer comprises a through-hole for fluidically communicating with said hollow portion of said soft layer so as to discharge air accumulated within said hollow portion of said soft layer when said soft layer elastically deforms.

6. A buffer clip according to claim 1, wherein:

said flange of said leg means has a disk-shaped configuration.

7. A buffer clip according to claim 1, wherein:

said first engagement means of said flange comprises an annular recessed portion formed upon an outer peripheral portion of said flange; and said second engagement means of said soft layer comprises an annular catch which engages said annular recessed portion of said flange.

8. A buffer clip according to claim 1, wherein:

one side of said soft layer which is adapted to elastically engage an impact member is formed as a substantially spherical surface.

9. A buffer clip according to claim 8, wherein:

an opposite side of said soft layer, which is not adapted to be engaged by an impact member, is hollow at its central portion.

10. A buffer clip according to claim 9, wherein said soft layer elastically deforms with its outer peripheral portion serving as a supporting point.

11. A buffer clip according to claim 1, wherein said leg portion and said flange are formed integrally with each other.

12. A buffer clip according to claim 1, wherein:

said leg means comprises a plurality of claw portions projecting from one end of said leg means and extending in divergent directions so as to be capable of bending radially inwardly toward said leg means when said leg means is inserted into a mounting hole defined within a body member.

13. A buffer clip according to claim 12, wherein:

respective ends of said plurality of claw portions extend uprightly and parallel with said leg means.

14. A buffer clip according to claim 13, wherein:

each one of said plurality of claw portions comprises a stepped portion so that an end portion of said claw portion is thinner than a body portion of said claw portion and said stepped portion is adapted to engage an edge portion of a mounting hole defined within a body member.

15. A buffer clip as set forth in claim 1, wherein:

said soft layer comprises an elastomer.

16. In combination with an automotive vehicle panel wherein a sun visor is pivotably mounted within the interior of an automotive vehicle and with respect to said automotive vehicle panel, a buffer clip which is to be mounted upon said vehicle panel so as to absorb impact forces and shocks which would otherwise be generated as a result of a free end portion of said sun visor forcibly impacting against said vehicle panel, comprising:

leg means for insertion within a mounting hole defined within said vehicle panel and having means thereon for engaging a first surface of said vehicle panel;

a flange formed upon said leg means for engaging a second opposite surface of said vehicle panel such that said buffer clip is secured to said vehicle panel;

means covering said flange and being elastically deformable for absorbing impact forces and shocks when said sun visor, which would otherwise impact against said vehicle panel, impacts against said flange covering means;

first engagement means defined upon said flange; and second engagement means defined upon said flange covering means for engaging said first engagement means of said flange such that said flange covering means is mechanically secured upon said flange.

17. The combination as set forth in claim 16, wherein:

the interior surface of said vehicle panel is covered with a covering material; and the side of said flange covering means which is disposed toward, and is impacted by, said free end of said sun visor is covered with a covering material which is similar to said covering material of said vehicle panel.

18. The combination as set forth in claim 16, wherein:

said flange covering means comprises an elastomer.

19. The combination as set forth in claim 16, wherein:

a hollow portion is defined between an inside surface portion of said flange covering means and said flange so as to permit said flange covering means to flexibly deform under the influence of an impact force from said free end portion of said sun visor.

20. The combination as set forth in claim 16, wherein:

said first engagement means of said flange comprises an annular recessed portion formed upon an outer peripheral portion of said flange; and said second engagement means of said flange covering means comprises an annular catch which engages said annular recessed portion of said flange.

21. A buffer clip which is adapted to be mounted upon a body member so as to absorb impact forces and shocks which would otherwise be generated as a result of another member forcibly coming into contact with the body member, comprising:

leg means for insertion into a mounting hole defined within a body member and having means thereon for engaging a first surface of a body member;

flange means formed upon said leg means for engaging a second opposite surface of a body member when said leg means is inserted into a mounting hole of a body member and said engaging means of said leg means is adapted to engage a first surface of a body member such that said buffer clip can be secured to a body member;

cover means mounted upon said flange means of said leg means so as to be elastically deformable with respect to said flange means and thereby be capable of absorbing impact forces and shocks when another member, which would otherwise impact against a body member, impacts against said cover means mounted upon said flange means of said leg means; and means for attaching said cover means upon said flange means such that said cover means is mechanically secured upon said flange means of said leg means.

22. A buffer clip as set forth in claim 21, wherein:

a hollow portion is defined between an inside surface portion of said cover means and said flange means so as to permit said cover means to flexibly deform under the influence of an impact force from another member when another member, which would otherwise impact against a body member, impacts against said cover means mounted upon said flange means of said leg means.

* * * * *